No. 786,752. PATENTED APR. 4, 1905.
G. W. GILMORE.
CIRCUIT CONTROLLING DEVICE FOR MOTORS.
APPLICATION FILED SEPT. 15, 1904.
2 SHEETS—SHEET 2.
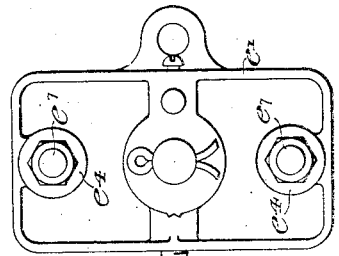
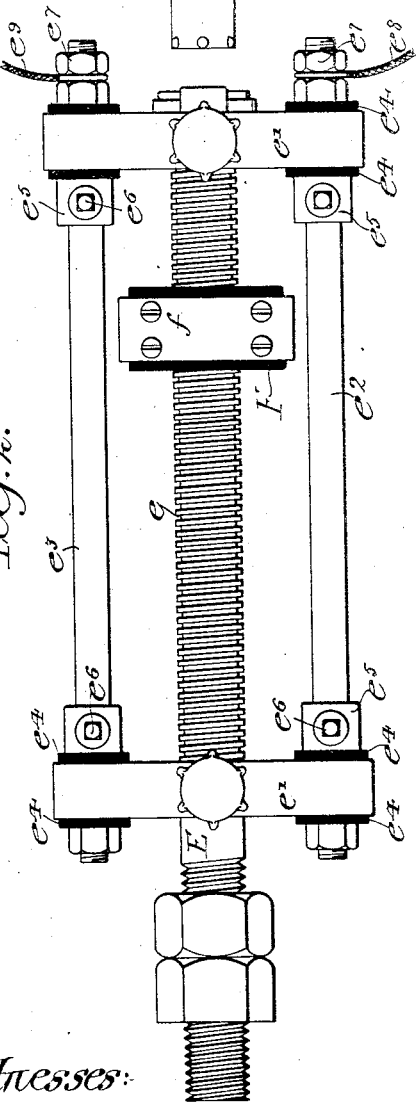
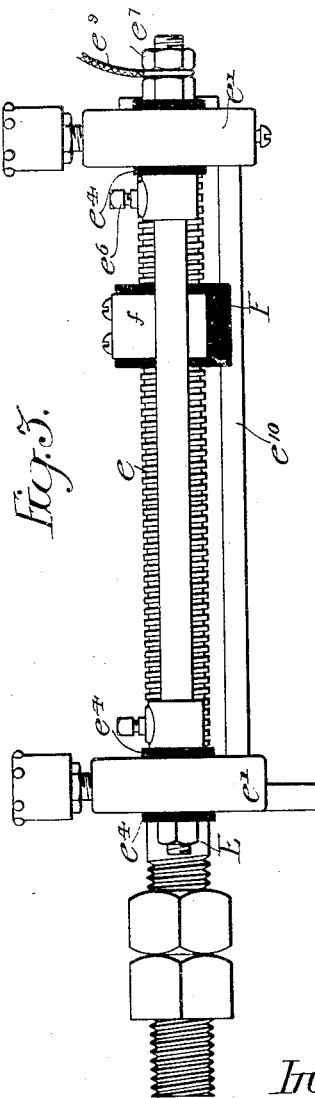
Witnesses:
Wesley H. Reel
Titus N. Foons.
Inventor:
George W. Gilmore
by his Attorneys;
Howson & Howson No. 786,752. Patented April 4, 1905.

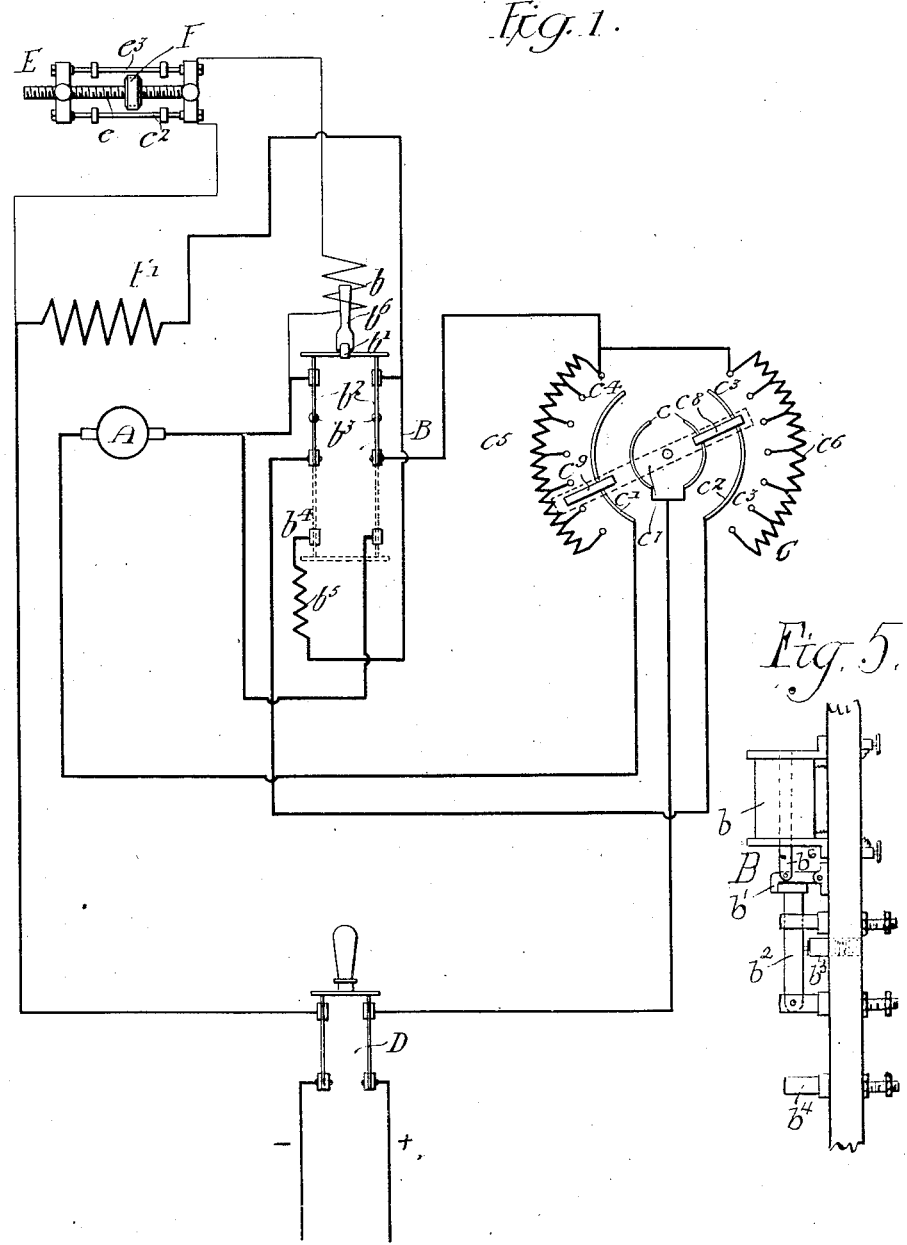

UNITED STATES PATENT OFFICE.

GEORGE W. GILMORE, OF ALLIANCE, OHIO, ASSIGNOR TO THE ALLIANCE MACHINE COMPANY, OF ALLIANCE, OHIO, A CORPORATION OF OHIO.

CIRCUIT-CONTROLLING DEVICE FOR MOTORS.

SPECIFICATION forming part of Letters Patent No. 786,752, dated April 4, 1905.

Application filed September 15, 1904. Serial No. 224,672.

*To all whom it may concern:*

Be it known that I, GEORGE W. GILMORE, a citizen of the United States, residing at Alliance, Ohio, have invented certain Improvements in Circuit-Controlling Devices for Motors, of which the following is a specification.

One object of my invention is to provide a combination of apparatus whereby mechanism driven by an electric motor shall at a predetermined time in its operation actuate a device for cutting off the supply of current to said motor, a further object of the invention being to provide a system by which mechanism operated by an electric motor will after it has been actuated for a predetermined time cause flow of current in an auxiliary circuit, and thereby operate an automatic switch to cut off the supply of current to the motor.

It is also desired to provide an adjustable device for regulating the point at which mechanism actuated from an electric motor shall cause the operation of apparatus for cutting off the supply of current to said motor.

These objects I attain as hereinafter set forth, reference being had to the accompanying drawings, in which—

Figure 1 is a diagrammatic view illustrating the preferred arrangement of apparatus comprising my invention. Fig. 2 is a plan view of the preferred form of circuit-closer employed as part of my invention. Figs. 3 and 4 are respectively side and end elevations of the structure shown in Fig. 2, and Fig. 5 is a side elevation showing the detail construction of one of the pieces of apparatus employed as part of my invention.

In the above drawings, A represents the armature of an electric motor having a field-winding F' and connected to a reversing-controller C. Whatever mechanism is driven by said motor has operatively connected to it a shaft E, provided with a threaded portion $e$, carried in bearings $e'$ and supported in any desired manner. Said bearings project on both sides of the shaft E and have extending between them a pair of metallic rods or bars $e^2$ and $e^3$, which, however, are insulated from said bearings by bushings $e^4$, of non-conducting material. Upon each of the bars are two adjustable collars $e^5$, which may be held in any desired position by means of set-screws. A nut F, of insulating material, is threaded to receive the threaded shaft $e$ and has fixed to it a U-shaped piece of metal $f$ of such dimensions that it may engage the collars $e^5$ on the bars $e^2$ and $e^3$ and if two of these be in line will form electrical connection between them. Nuts $e^7$ are provided on portions of the bars $e^2$ and $e^3$, projecting outside of one of the bearings $e'$ for the attachment of wires $e^8$ and $e^9$, which form part of the electric circuit shown diagrammatically in Fig. 1.

Referring to Fig. 1, it will be seen that current is supplied through a double-pole switch D, one terminal of which is connected to the segments $c$ of the controller C. Concentrically placed relatively to these segments are a pair of segments $c'$ and $c^2$, of which the first is connected to one terminal of the motor-armature A and the other is connected to one of the pivotal terminals of the circuit-breaker B.

In addition to the segments noted there are two series of contact-buttons $c^3$ and $c^4$ also arranged concentrically with segments $c$, to which are connected two banks of resistance $c^5$ and $c^6$, connected to each other and to the second pivotal terminal of the circuit-breaker B. A pivoted contact-arm is represented in dotted lines at $c^7$. This carries two contact-plates $c^8$ and $c^9$, of which the first is placed to bridge between the contacts $c$ and either of the contact-segments $c'$ or $c^2$, while the second is placed to bridge between that one of the segments $c'$ or $c^2$ not engaged by the plate $c^8$ and one of the series of contact-buttons $c^3$ or $c^4$.

It will be noted from Fig. 5 that the circuit-breaker B is of the double-throw double-pole type and is constantly pressed outwardly from the position shown in Fig. 1 by means of two devices $b^5$, acting upon its blades, which are preferably of the well-known spring-plunger type. One of the upper terminals of the circuit-breaker is connected to one of the armature-terminals of the motor, while the other is connected to one of the terminals of the field-winding and also to the terminal $b^4$ of the circuit-breaker B through a bank of resistance $b^5$. This latter terminal is so placed as to be engaged by that one of the circuit-breaker blades whose pivotal support is connected to the segment $c^2$ of the controller C, said blade moving into engagement with said terminal when released from the position shown in Fig. 1 by movement of the trigger $b'$.

It will be seen that there is an armature $b^6$ attached to the trigger $b'$ and placed to be acted upon by the magnet $b$, so that when this latter is energized said armature, and with it the trigger, will be raised, so as to release the blades $b^2$ of the circuit-breaker.

The second terminal $e^8$ of the circuit-closing device actuated from the shaft E is connected to the second terminal of the field-winding F' of the motor, which in turn is connected to one of the supply-mains through main switch D.

Under operating conditions, with the switch D and the circuit-breaker B in the position shown in Fig. 1 current will be supplied to the motor and the operating-handle of the controller C will be placed so that its contact-plates $c^8$ and $c^9$ engage their respective segments and contact-buttons on said controller.

The operation of the motor actuates whatever apparatus is connected to it and also turns the shaft E, thereby causing the nut F, which is held from revolving by means of a bar $c^{10}$, to move longitudinally of the screw $e$ until its metallic portion $f$ engages two of the collars $e^5$. Such engagement completes the circuit through the magnet $b$, energizing it and causing the trigger $b'$ to be raised, so as to permit of the opening of the circuit-breaker and the consequent cutting off of current from the motor.

In order that the motor may be quickly brought to rest, I cause the armature to be short-circuited and supply the field-winding F' with current through the resistance $b^5$ and the secondary terminal $b^4$ of the circuit-breaker B, it being noted that said circuit-breaker is violently turned on its pivotal or hinge supports, so that one of the blades $b^2$ engages this terminal $b^4$ and so completes the circuit from the positive supply-main through the segment $c$, plate $c^8$, segment $c^2$, blade $b^2$ of circuit-breaker B, terminal $b^4$, resistance $b^5$, and field-winding F' and to the negative supply-main. The second blade by engaging the terminal $b^0$ completes the circuit from the armature through said circuit-breaker to the resistance $b^5$, through contact-plate $c^9$ on arm $c^7$, contact-segment $c'$, and back to the armature.

The number of revolutions made by the shaft E before the operation of the motor is stopped by the opening of the circuit-breaker B and the consequent cutting off of current may be varied as desired by adjusting the positions of the collars $e^5$ upon the bars $e^2$ and $e^3$.

I claim as my invention—

1. A circuit-controlling device including a frame having two guide-bars electrically insulated from each other, a screw, driving means, an insulating-nut on said screw, a contact-piece on the nut, and adjustable contacts respectively supported upon the guide-bars so as to be engaged by said contact-piece on the nut, substantially as described.

2. The combination of a screw, means for moving the same, a nut on the screw, a contact-piece carried by said nut, a normally fixed but adjustable block, and means for supporting said block so that it may be engaged by said nut, substantially as described.

3. The combination of a screw, a frame including a pair of guides, contact-pieces adjustable on said guides and a nut on the screw having a portion placed to engage the contacts on the guides, substantially as described.

4. The combination of a screw, a frame including a bar or bars extending substantially parallel to the screw, a nut threaded on the screw having means whereby its rotation is prevented, a contact-piece on the nut and a contact or contacts movably carried by the said bar or bars and placed to be engaged by said contact-piece on the nut, substantially as described.

5. The combination of a screw, a frame having bearings for the same, bars carried by the frame substantially parallel with the screw, a collar or collars on said bars and a nut on the screw placed to engage said collar or collars, substantially as described.

6. The combination of a screw, a frame, contact-pieces adjustable on said frame and electrically insulated from one another, a nut on the screw, with a contact-piece carried by said nut and insulated from the screw, substantially as described.

7. A system including an electric motor, a screw driven thereby, a switch controlled by said screw, an automatic switch in circuit with said motor, with a solenoid in circuit with the screw-controlled switch and provided with means for causing operation of the automatic switch, substantially as described.

8. A system including an electric motor, a switch in circuit therewith, a solenoid provided with means for causing operation of said switch, a screw operated by the motor, a contact-piece moved by said screw and a contact or contacts in circuit with said solenoid and placed to be electrically connected to a source of power by said movable contact, substantially as described.

9. A system including an electric motor, a switch in circuit therewith, a solenoid controlling the operation of said switch, a screw operated by said motor, a pair of adjustable contacts connected respectively to said solenoid and to a source of power, and a device movable by the screw and placed to bridge between said contacts, substantially as described.

10. A system including an electric motor, a switch operated thereby, a solenoid in circuit with said switch, a second switch in circuit with the motor and mechanism operated by said solenoid for causing operation of the second switch, substantially as described.

11. A system including an electric motor, a switch constructed to be operated thereby at predetermined times, a second switch in circuit with the motor including means for short-circuiting the motor-armature independently of supply-mains, with mechanism controlled by the first switch for causing operation of the second switch, substantially as described.

12. The combination with a motor, of a circuit-closer operated thereby, a double-throw switch having a winding in circuit with said closer, means for connecting the motor to supply-mains when the switch is in one position and means for short-circuiting the armature of said motor independently of said mains when the switch is in its other position, substantially as described.

13. The combination with a motor, of a circuit-closer operated thereby, a double-throw switch having a winding in circuit with said closer and provided with connections for supplying current to the motor from supply-mains, said switch also having connections for short-circuiting the armature on itself and connecting the motor-field across the supply-mains, substantially as described.

14. The combination of a double-throw switch, means including a solenoid for causing said switch to disengage one of its sets of terminals and engage another set, a bank of resistance in circuit with one of the terminals and a circuit-closer operated by the motor, in circuit with said solenoid, said switch having means for connecting the motor to supply-mains when it is in one position and also having means for connecting the field-winding only to said mains through said resistance and short-circuiting the armature on itself when in its other position, substantially as described.

In testimony whereof I have signed my name to this specification in the presence of two subscribing witnesses.

GEORGE W. GILMORE.

Witnesses:
　EDWIN W. DIEHL,
　J. J. BROWN.